INVENTOR.
EDWARD GADD
BY
ATTORNEYS

United States Patent Office 3,522,508
Patented Aug. 4, 1970

3,522,508
CONTROL CIRCUIT IN ELECTRICAL
GENERATING SYSTEM
Edward Gadd, Cleveland, Ohio, assignor to Victoreen Leece Neville, Inc., a corporation of Ohio
Filed Apr. 5, 1967, Ser. No. 628,714
Int. Cl. H02j 7/04
U.S. Cl. 320—39    12 Claims

ABSTRACT OF THE DISCLOSURE

A control circuit for a vehicle battery-charging alternator-rectifier unit includes a switching transistor connected to the field winding of the alternator to control its energization. The output voltage of the alternator-rectifier unit is regulated by an impedance bridge having a Zener diode in one leg. This voltage-regulating bridge turns on the switching transistor when this voltage drops below rated value. A full-wave rectifier bridge is transformer-coupled to one A.C. output phase of the alternator in circuit with the field winding and the switching transistor for energization of the field winding from this output phase of the alternator through the switching transistor. This rectifier bridge isolates the voltage-regulating impedance bridge from the field winding so that its regulating action is not influenced by the field current.

---

This invention relates to a control circuit in an electrical generating system which includes a voltage generating machine, such as an alternator-rectifier unit, which energizes a load including a battery, such as on an automotive vehicle.

A principal object of this invention is to provide a novel and improved control circuit for regulating a voltage generating machine by controlling the input energization of the machine by means of circuitry which senses the electrical output of the machine in such a manner that the accuracy of the output-sensing circuitry is unaffected by the input current to the machine.

Another object of this invention is to provide such a control circuit in which the output-sensing circuitry is effectively isolated from the input energizing current circuit for the machine, so that the accuracy of its output-sensing operation is not adversely affected by the input current to the machine.

A further object of this invention is to provide such a control circuit having provision for preventing feedback between the output-sensing circuitry and the machine output which would adversely affect the operation of the output-sensing circuitry.

A still further object of this invention is to provide such a control circuit having a semiconductor switch connected in series with the input energizing winding of the machine and connected to the output-sensing circuitry to control the input energizing current for the machine in accordance with the electrical output of the machine sensed by the output-sensing circuitry.

Another object of this invention is to provide for use with an alternator-rectifier unit a novel and improved control circuit having a rectifier bridge which is transformer-coupled to one A.C. output phase of the alternator and is connected to the alternator field winding to provide rectified energizing current for the field winding and also to isolate the output voltage-sensing circuitry from the field winding.

Figure 1:
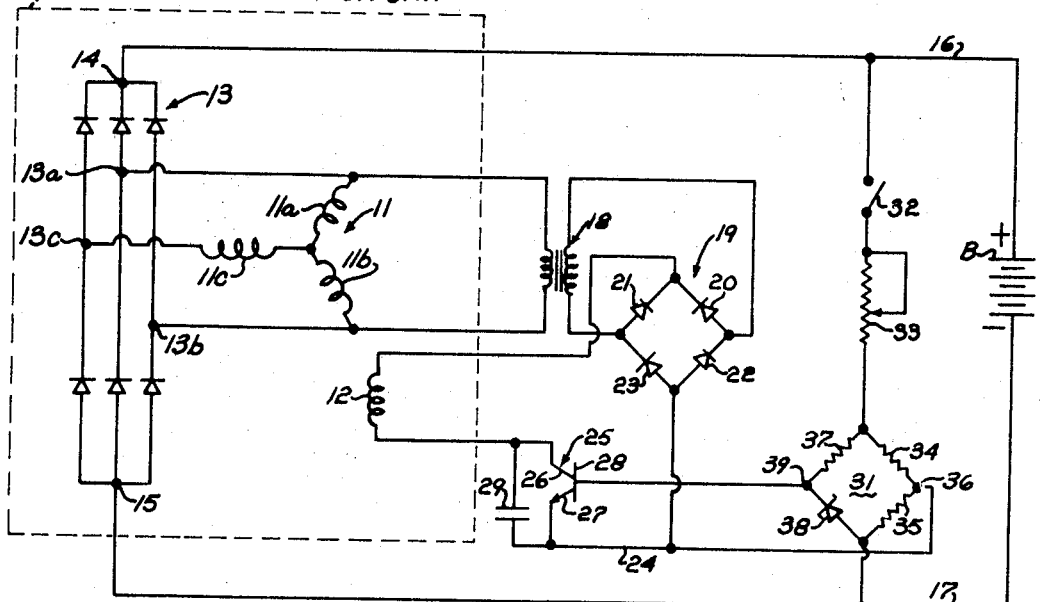
Figure 2:
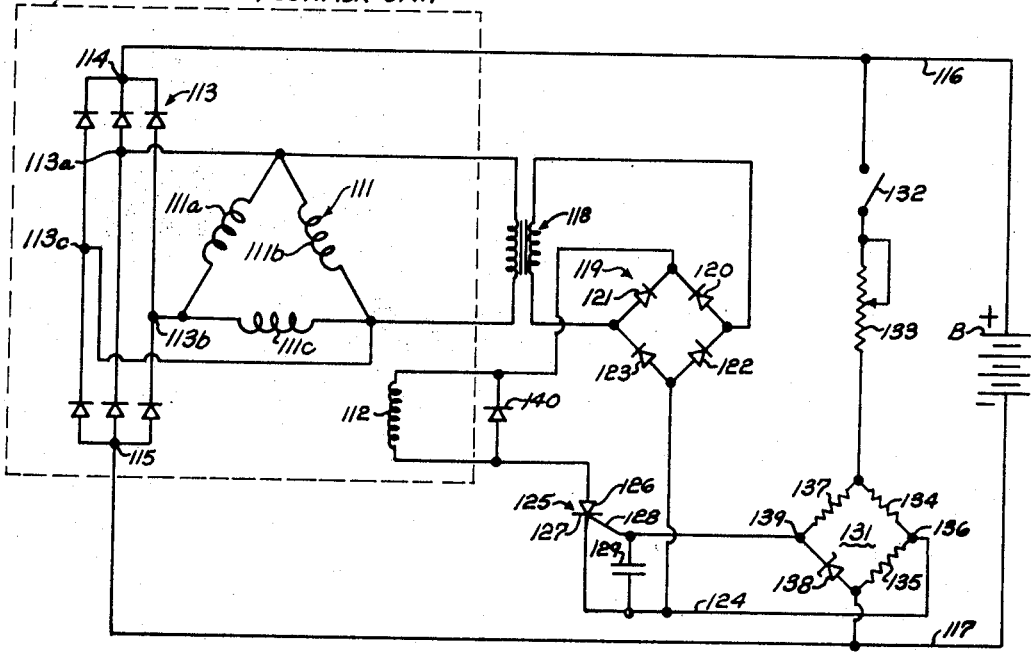

Further objects and advantages of the present invention will be apparent from the following detailed description of two presently-preferred embodiments thereof, which are illustrated in the accompanying drawing, in which:

FIG. 1 is a schematic circuit diagram of an electrical generating system having a control circuit in accordance with a first embodiment of the present invention; and FIG. 2 is a similar view showing a generating system having a control circuit in accordance with a second embodiment of the present invention.

Referring first to FIG. 1, the control circuit of the present invention is shown associated with an alternator-rectifier unit 10 of known design. The alternator in this unit has a three-phase armature winding 11 on the stator and a field winding 12 on the rotor. The different phase windings of the armature are designated by the reference numerals 11a, 11b and 11c, respectively, and are shown Y-connected, although they may be delta-connected, if desired. These phase windings are connected to the respective input terminals 13a, 13b and 13c of a full-wave output rectifier 13 for the alternator-rectifier unit 10. Rectifier 13 has positive and negative output terminals 14 and 15. The positive output terminal 14 is connected to a positive load conductor 16. The negative output terminal 15 is connected to a negative load conductor 17, which may be grounded. The load which is to be energized by the alternator includes a storage battery B connected across the load conductors 16 and 17. The alternator-rectifier unit 10 and the battery B may be on a vehicle, such as an automobile, with the alternator being driven by the vehicle engine.

In accordance with the present invention, the field winding 12 is energized from a single phase of the A.C. output of the alternator through an isolating transformer 18 and a full-wave rectifier bridge 19. The transformer has a 1:1 turns ratio between its primary winding, which is connected across one phase of the alternator output, and its secondary winding, which is inductively coupled to the primary winding. The rectifier bridge 19 includes a first semiconductor rectifier diode 20 connected between the upper end of the secondary winding of transformer 18 and the upper end of the field winding 12 in FIG. 1, a second semiconductor rectifier diode 21 connected between the lower end of the transformer secondary and the upper end of the field winding 12, a third semiconductor rectifier diode 22 connected between the upper end of the transformer secondary and a line 24, and a fourth semiconductor rectifier diode 23 connected between the lower end of the transformer secondary and line 24.

A field current switching means in the form of a transistor 25 is connected between the lower end of the field winding 12 and line 24. This switching transistor has a collector electrode 26 connected directly to the lower end of field winding 12, an emitter electrode 27 connected directly to line 24, and a base electrode 28. The collector and emitter electrodes 26, 27 are the current conducting elements or output electrodes of the transistor 25 and the base electrode 28 is its control electrode. A capacitor 29 is connected across the collector and emitter electrodes of switching transistor 25.

With this arrangement, assuming that the switching transistor 25 is rendered conductive, it will be apparent that during those half cycles of the alternator when its A.C. output induces a voltage across the secondary winding of transformer 18 which is + to − from top to bottom in FIG. 1, positive current will flow from the upper end of this winding through the first rectifier diode 20 in bridge 19, the field winding 12, the collector-emitter path 26, 27 of transistor 25, line 24, and through the fourth rectifier diode 23 in the bridge to the lower end of the transformer secondary winding.

Conversely, when the A.C. output of the alternator is such that it induces across the secondary winding of transformer 18 which is + to − from bottom to top in FIG. 1, positive current will flow from the lower end of this winding through the second rectifier diode 21 in bridge 19, the field winding 12, the collector-emitter path 26, 27 of transistor 25, and through the third rectifier diode 22 in bridge 19 to the upper end of the transformer secondary winding.

The switching transistor 25 is normally non-conductive. It becomes conductive when a turn-on signal is applied to its base electrode 28 such that the base electrode is made positive with respect to the emitter electrode 27.

In accordance with the present invention, the operation of switching transistor 25 in the field circuit of the alternator is controlled by an impedance bridge 31, which is connected in series with a switch 32 and a potentiometer 33 across the D.C. output terminals 14, 15 of the alternator-rectifier unit 10 to sense the latter's D.C. output voltage, as described hereinafter.

Switch 32 may be contacts of an ignition switch on an automotive vehicle whose engine drives the alternator 11, 12.

The impedance bridge 31 has a first branch composed of first and second impedance legs, which are constituted respectively by two resistors 34 and 35 of equal ohmic value connected in series with each other between the lower end of potentiometer 33 and the negative load conductor 17. The juncture 36 between these two resistors 34, 35 is connected directly to line 24 which, as already stated, is connected directly to the emitter electrode 27 of transistor 25.

The impedance bridge 31 has a second branch connected in parallel with the first branch and composed of a third impedance leg, constituted by a resistor 37 having the same ohmic value as each of resistors 34 and 35, and a fourth impedance leg, constituted by a Zener diode 38, which is connected in series with resistor 37 between the lower end of potentiometer 33 and the negative load conductor 17. The juncture 39 of resistor 37 and Zener diode 38 is connected directly to the base electrode 28 of transistor 25.

As is well understood, the Zener diode has the inherent characteristic of providing a constant voltage drop when it breaks down to conduct current in the reverse direction. For example, in the FIG. 1 circuit, the Zener diode may be designed to produce a 7.5 volt drop in the reverse polarity direction. Assuming that it is desired to maintain the battery voltage at 15 volts and assuming further that the voltage drop across the potentiometer is negligibly small and may be ignored, when switch 32 is closed, if the battery voltage is at the rated value (15 volts) the voltage at point 36 will be +7.5 volts and the voltage at point 39 will be +7.5 volts. In that case, the base electrode 28 of transistor 25 will be at the same potential as the emitter electrode 27, and transistor 25 will be off (i.e., there will be no appreciable current flow through its collector-emitter path 26, 27).

However, if the battery voltage drops to, say, 14 volts, then the voltage at point 36 will drop to 7 volts (due to the voltage-dividing action of the equal resistors 34, 35) whereas the voltage at point 39 will be 7.5 volts (due to the constant voltage drop across the Zener diode 38). Consequently, the base electrode 28 of transistor 25 will be 0.5 volt positive with respect to the emitter electrode 27, and the resultant base-emitter current will turn on transistor 25 for current flow through its collector-emitter path 26, 27.

With this arrangement, therefore, the impedance bridge 31 senses the voltage across the load conductors 16, 17 and controls the field current flow through the switching transistor 25. When the battery voltage is too low, transistor 25 will be rendered conductive (as described) to permit current to flow through the field winding 12 so as to increase the input energization of the alternator and bring the D.C. output voltage of the alternator-rectifier unit up to the level for which the regulator has been set. As this level is approached, the input signal across the base and emitter electrodes 28, 27 of transistor 25 will be reduced accordingly, causing transistor 25 to reduce the field current flowing between its collector and emitter electrodes 26, 27. That is, there will be a gradual change in the magnitude of the current flowing through the field winding 12 and transistor 25, instead of an abrupt on-and-off cyclic change in the field current. The potentiometer 33 is adjusted to set the desired regulation level for the regulator bridge 31.

An important advantage of the present invention is that the rectifier bridge 19, which is transformer-coupled to one phase of the A.C. output of the alternator, isolates the regulator bridge 31 from the field circuit of the alternator. It does this by providing a low impedance path for the field current flowing through field winding 12 and the collector-emitter path 26, 27 of transistor 25, so that this field current is bypassed away from the regulator bridge 31. Therefore, the operation of the regulator bridge 31 is determined only by the D.C. output voltage appearing across the load conductors 16, 17 and is unaffected by the current through the field winding 12 of the alternator. Thus, the rectifier bridge 19 performs the function of isolating the regulator bridge 31 from the field circuit, as well as the function of rectifying the single-phase A.C. output voltage of the alternator to provide unidirectional field current to the field winding 12.

The transformer 18 isolates the alternator armature 11 from the regulator bridge 31 to prevent feedback interference between the regulator bridge and the armature, by way of rectifiers 22 and 23 in the rectifier bridge 19, which would adversely affect the voltage-sensing operation of the regulator bridge.

FIG. 2 shows a second embodiment of the present invention which is essentially similar to the embodiment of FIG. 1, except that the semiconductor switching means in series with the field winding of the alternator is a silicon-controlled rectifier 125, instead of a transistor. In FIG. 2, the armature windings of the alternator are shown as delta-connected, although they may be Y-connected, if desired. Corresponding elements of the FIG. 2 circuit are given the same reference numerals, plus 100, as the elements of FIG. 1, and the detailed description of these elements will not be repeated.

In FIG. 2, a field discharge rectifier 140 is connected across the field winding 112 of the alternator to discharge the voltage present across the field winding when the silicon-controlled rectifier 125 is turned off, which takes place abruptly. The capacitor 129 is connected between the gate electrode 128 and the cathode 127 of the SCR 125.

In other respects, the FIG. 2 circuit is essentially similar in operation to the FIG. 1 circuit, already described in detail.

While two presently-preferred embodiments of this invention have been described in detail with reference to the accompanying drawing, it is to be understood that the invention is susceptible of other embodiments and that various modifications, omissions and refinements which depart from the disclosed embodiments may be adopted without departing from the scope of the present invention.

Having described my invention, I claim:

1. A control circuit for a voltage generating machine having an input energizing winding, said control circuit comprising:

switch means having current conducting elements for connection in circuit with said input energizing winding of the machine;

sensing means for connection to the machine to sense the latter's electrical output and connected to said switch means to cause the latter to pass current through its current conducting elements when the electrical output of said machine deviates from a predetermined value;

and circuit means for coupling said switch means and said energizing winding to the machine output for energization of said winding by the machine output when said switch means passes current between its current conducting elements, said circuit means including means for isolating said sensing means from said winding so that the operation of said sensing means is unaffected by the current through said winding;

said switch means comprising a semiconductor device having a control electrode and having output electrodes which are said current conducting elements;

and said circuit means comprising a transformer having a primary winding for connection to the output of said machine and having a secondary winding inductively coupled to said primary winding, and a rectifier bridge connected across said secondary winding and connected to said input energizing winding and said output electrodes of the semiconductor device to pass rectified output current from the alternator to said input energizing winding when said semiconductor device is rendered conductive for current flow between its output electrodes.

2. A control circuit according to claim 1, wherein said semiconductor device is a transistor.

3. A control circuit according to claim 1, wherein said semiconductor device is a controlled rectifier.

4. A control circuit according to claim 4, wherein said sensing means comprises:

an impedance bridge having a first branch for connection to the machine output composed of first and second impedance legs connected in series with each other, a second branch connected across said first branch and composed of third and fourth impedance legs connected in series with each other, said first, second and third impedance legs having equal resistances and said fourth impedance leg comprising a Zener diode;

and said control circuit further comprises:

means for applying across the control electrode and one of said output electrodes of the semiconductor device a signal corresponding to the voltage difference between the juncture of said first and second impedance legs and the juncture of said third and fourth impedance legs in the bridge.

5. A control circuit according to claim 4, and further comprising potentiometer means connected in series with said impedance bridge for connection across the machine output, said potentiometer means being adjustable to set the desired regulation level for said impedance bridge.

6. A control circuit according to claim 5, and further comprising a switch connected in series with said potentiometer means and said impedance bridge.

7. In an electrical generating system having a voltage generating machine with an input energizing winding, a control circuit comprising:

switch means having current conducting elements connected in series with said input energizing winding of the machine;

voltage sensing means connected to the machine output to sense the latter's output voltage and connected to said switch means to render said switch means operative to pass current through its current conducting elements when the output voltage of the machine is below a predetermined value;

and circuit means coupled to the output of the machine in series with said current conducting elements of said switch means and said energizing winding to pass energizing current to said winding from the machine when said switch means is rendered operative to pass current between its current conducting elements, said circuit means including means for isolating said voltage sensing means from said winding so that the operation of said sensing means is unaffected by the current through said winding;

said machine being an alternator-rectifier unit comprising an alternator and output rectifier means;

said switch means comprising a semiconductor device having a control element and having output electrodes which are said current conducting elements;

and said circuit means comprising a transformer having a primary winding connected to the output of said alternator ahead of said output rectifier means in the alternator-rectifier unit to receive A.C. output energy from said alternator, said transformer having a secondary winding, a rectifier bridge connected across said secondary winding of the transformer and providing rectifiers connected in series with said input energizing winding of the alternator and said output electrodes of the semiconductor device to pass rectified current to said input energizing winding when said semiconductor device is rendered conductive for current flow between its output electrodes.

8. A generating system according to claim 7, wherein said semiconductor device is a transistor.

9. A generating system according to claim 7, wherein said semiconductor device is a controlled rectifier.

10. A generating system according to claim 7, wherein said sensing means comprises:

an impedance bridge having a first branch composed of first and second impedance legs connected in series with each other across the output of the alternator-rectifier unit, a second branch connected across said first branch and composed of third and fourth impedance legs connected in series with each other, said first, second and third impedance legs having equal resistances and said fourth impedance leg comprising a Zener diode;

and said control circuit further comprises:

means for applying across the control electrode and one of said output electrodes of the semiconductor device a signal corresponding to the voltage difference between the juncture of said first and second impedance legs and the juncture of said third and fourth impedance legs in the bridge.

11. A generating system according to claim 10, and further comprising positive and negative load conductors connected respectively to the positive and negative output terminals of the alternator-rectifier unit, a battery, means for connecting said battery across said load conductors, and a switch connected in series with said impedance bridge across said load conductors.

12. A generating system according to claim 11, and further comprising potentiometer means connected in series with said last-mentioned switch and said impedance bridge across said load conductors.

References Cited

UNITED STATES PATENTS

| | | | |
|---|---|---|---|
| 2,980,844 | 4/1961 | Peaslee | 322—28 |
| 3,343,059 | 9/1967 | Kirk et al. | 320—39 |
| 3,373,333 | 3/1968 | Eckard | 320—64 X |

LEE T. HIX, Primary Examiner

J. GUNTHER, Assistant Examiner

U.S. Cl. X.R.

320—64; 322—28, 73, 75

UNITED STATES PATENT OFFICE
CERTIFICATE OF CORRECTION

Patent No. 3,522,508          Dated August 4, 1970

Inventor(s) Gadd, Edward

It is certified that error appears in the above-identified patent and that said Letters Patent are hereby corrected as shown below:

In the claims:

Claim 4, line 1, change the numeral "4" to --1--.

(SEAL)
Attest:

Edward M. Fletcher, Jr.
Attesting Officer

WILLIAM E. SCHUYLER, JR.
Commissioner of Patents